(12) United States Patent
Jin

(10) Patent No.: US 12,104,898 B1
(45) Date of Patent: Oct. 1, 2024

(54) TRIANGULAR RULER

(71) Applicant: Longjin Jin, Yongkang (CN)

(72) Inventor: Longjin Jin, Yongkang (CN)

( * ) Notice: Subject to any disclaimer, the term of this patent is extended or adjusted under 35 U.S.C. 154(b) by 0 days.

(21) Appl. No.: 18/427,708

(22) Filed: Jan. 30, 2024

(30) Foreign Application Priority Data

Jul. 12, 2023 (CN) .......................... 202321821953.5

(51) Int. Cl.
  *G01B 3/08* (2006.01)
  *G01B 3/56* (2006.01)

(52) U.S. Cl.
  CPC ............... *G01B 3/08* (2013.01); *G01B 3/566* (2013.01)

(58) Field of Classification Search
  CPC .................................. G01B 3/08; G01B 3/566
  See application file for complete search history.

(56) References Cited

U.S. PATENT DOCUMENTS

| | | | | |
|---|---|---|---|---|
| 419,615 | A * | 1/1890 | Stilwell ..................... | G01C 9/24 33/343 |
| 7,114,264 | B1 * | 10/2006 | Hurley .................. | B43L 7/0275 33/481 |
| 9,429,424 | B2 | 8/2016 | Butler | |
| 11,161,366 | B2 * | 11/2021 | Walsh ................... | B43L 7/0275 |
| 11,325,413 | B2 * | 5/2022 | Walsh ................... | B43L 7/0275 |
| 11,465,437 | B2 * | 10/2022 | Walsh ................... | B43L 7/0275 |
| 11,554,604 | B2 * | 1/2023 | Walsh ....................... | B43L 7/02 |
| 11,780,260 | B1 * | 10/2023 | McGee ...................... | B43L 7/12 33/474 |
| 11,845,299 | B2 * | 12/2023 | Walsh ................... | G01B 3/566 |
| 11,987,069 | B2 * | 5/2024 | McGee ................. | G01B 3/566 |
| 2023/0122696 | A1 * | 4/2023 | Walsh ....................... | B43L 7/02 33/403 |

* cited by examiner

*Primary Examiner* — Yaritza Guadalupe-McCall
(74) *Attorney, Agent, or Firm* — Ying-Ting Chen; Law Office of Michael Chen

(57) ABSTRACT

A triangular ruler includes a triangular ruler body; a right-angle edge of the triangle ruler body is provided with an extended ruler, and the outer side of the extended ruler is provided with the angle scale line, the interior of the triangle ruler body and the extended ruler are both provided with matching rotating holes, and the adjustment part is provided at the connection between the triangle ruler body and the extended ruler. When measuring long distances, by rotating the extended ruler until coincides with the right-angle edge of triangle ruler body, the extended ruler and the triangle ruler body are combined for long-distance measurement.

6 Claims, 5 Drawing Sheets

TRIANGULAR RULER

FIELD OF THE INVENTION

The present invention relates to the technical field of measuring equipment, in particular to a triangular ruler that capable of measuring angles.

BACKGROUND OF THE INVENTION

Triangle ruler is a commonly used drawing tool, which has three angles, two right-angle edges and one bevel angle edge. It is generally divided into two types: 45-degree right-angled ruler and 60 degree right-angled ruler. When measuring with the triangle ruler, the longest bevel angle edge could not be effectively measured due to its limited length, what's more, the 45-degree triangular rulers and 60 degree triangular rulers is limited for angles measurement, trapezoid measurement, and other measurement processes.

A conventional triangle ruler is proposed by providing a ruler fixing part on the right-angle edge of the triangle ruler body, and providing a detachable second ruler on the ruler fixing part, the second ruler is fixed in the positioning groove of the first ruler and could form the right-angle with the edge adjacent to the ruler fixing part on the triangle ruler body, thereby combining to form a right-angle ruler, which could be used for measuring and processing various right angles.

By combined structure of triangle ruler and right-angle ruler, the prior art could achieve the function of right-angle ruler. However, it could not achieve the function of different angles measurement and trapezoid measurement, and additional tools are necessary for assistance. In addition, during the measurement process, it could not achieve the function of longer lengths measurement when measuring partial lengths.

SUMMARY OF THE DISCLOSURE

In view of this, the purpose of the present invention is to propose an extended triangle ruler that capable of measuring angles to solve the above-mentioned problems.

Therefore, in order to overcome the shortcomings of prior art, the present invention provides an extended triangular ruler capable of measuring angles, comprising the triangular ruler body, the extended ruler is provided on the right angle edge of the triangle ruler body, and the outer side of the extended ruler is provided with the angle scale line, the interior of the triangle ruler body and the extended ruler are both provided with matching rotating holes, and the adjustment part is provided at the connection between the triangle ruler body and the extended ruler, which is used for limiting the connection angle between the triangle ruler body and the extended ruler.

The adjustment part includes: the circular groove opened on one side of the extended ruler, the limiting hole corresponding to the circular groove is opened inside the triangular ruler body, the hollow sleeve is provided inside the limiting hole on the triangular ruler body, and the clamping column penetrates through the interior of the hollow sleeve, one end of the clamping column is in contact with the circular groove on the extended ruler.

Preferably, the aforementioned triangular ruler body in interconnected with the rotating hole opened inside the extended ruler, which is used for the penetration of clamping column.

The outer side of the clamping column and the inner wall of the hollow sleeve are provided with corresponding threaded parts.

Preferably, the accommodating groove is opened inside the inclined edge of the triangular ruler body, which is used for accommodating the extended ruler.

Preferably, one side of the accommodating groove within the triangular ruler body is provided with a semi-circular opening, which is used for the rotation of the extended ruler.

Preferably, the elastic protrusion is provided inside the accommodating groove of the triangular ruler body, and the elastic protrusion is in the structure of arc-shaped, one end of the extended ruler is provided with the arc-shaped groove that matches with the elastic protrusion.

The beneficial effects of the present invention are: when measuring for long distances, by rotating the extended ruler until coincides with the right-angle edge of triangle ruler body, the extended ruler is combined with the triangle ruler body for long-distance measurement. By adjusting the clamping column within the adjusting part penetrates through the hollow sleeve and connected with the circular groove of the extended ruler, the extended ruler is restricted to prevent movement during surveying and mapping.

When measuring trapezoids or angles, the extended ruler and the bevel edge of the triangle ruler body could form an included angle during the rotation of the extended ruler, combined with the angle marking on the extended ruler, the angle measurement and the trapezoid measurement could be carried out through the included angle. In addition, the angle could be restricted by the adjustment part to prevent movement during surveying and mapping, meeting the requirements of trapezoid and angle measurement, with wide applicability.

BRIEF DESCRIPTION OF THE DRAWINGS

Other features, objects and advantages of the present invention will be more clearly and completely by the detailed description of the non-limiting embodiments with reference to the attached drawings. Obviously, the described embodiments are only part of the embodiments of the present invention, but not all of them. Based on the embodiment of the present invention, all other embodiments obtained by ordinary technicians in the field without creative labor are within the scope of the present invention.

DETAILED DESCRIPTION OF THE PREFERRED EMBODIMENTS

Figure 1:
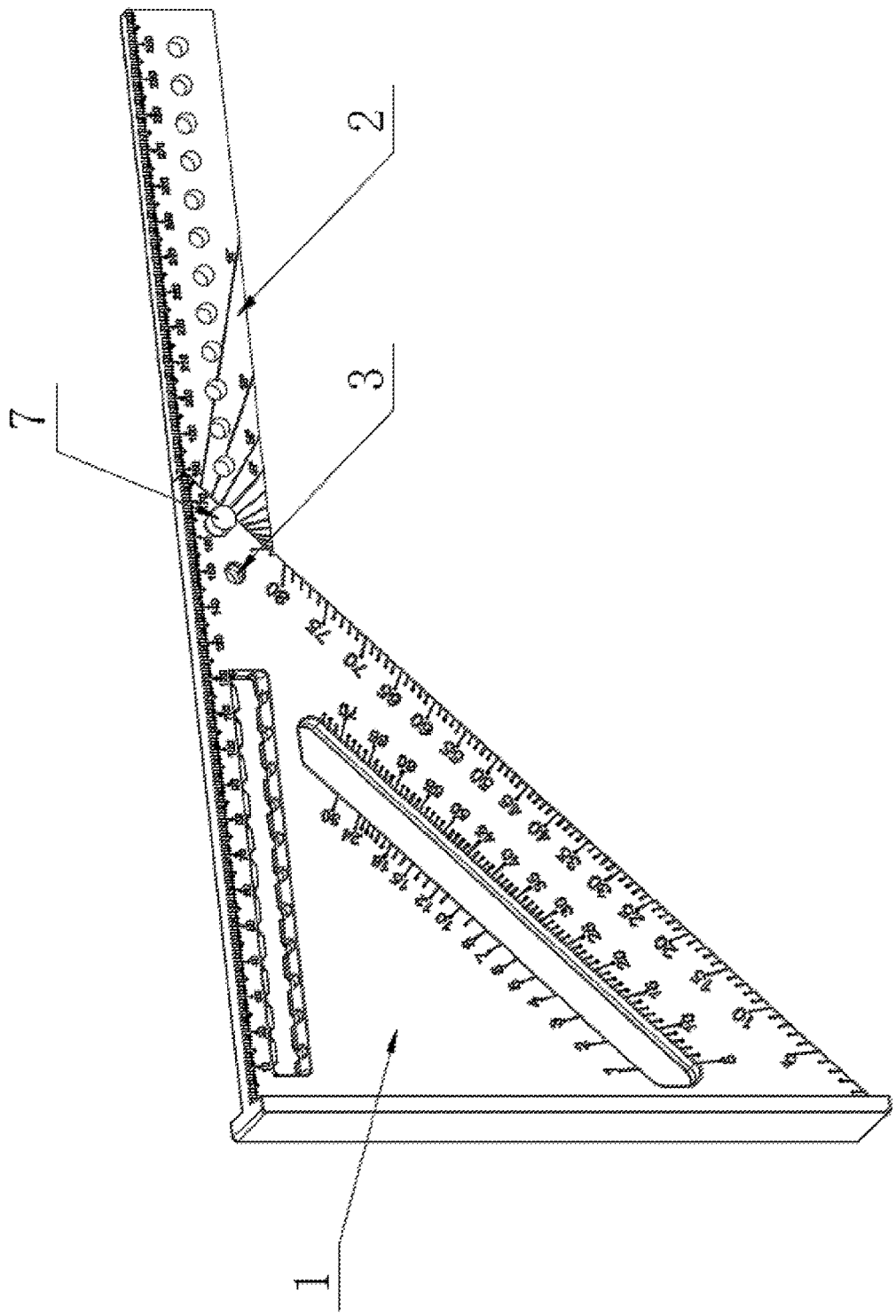
FIG. 1 is the perspective view of the present invention.
Figure 2:
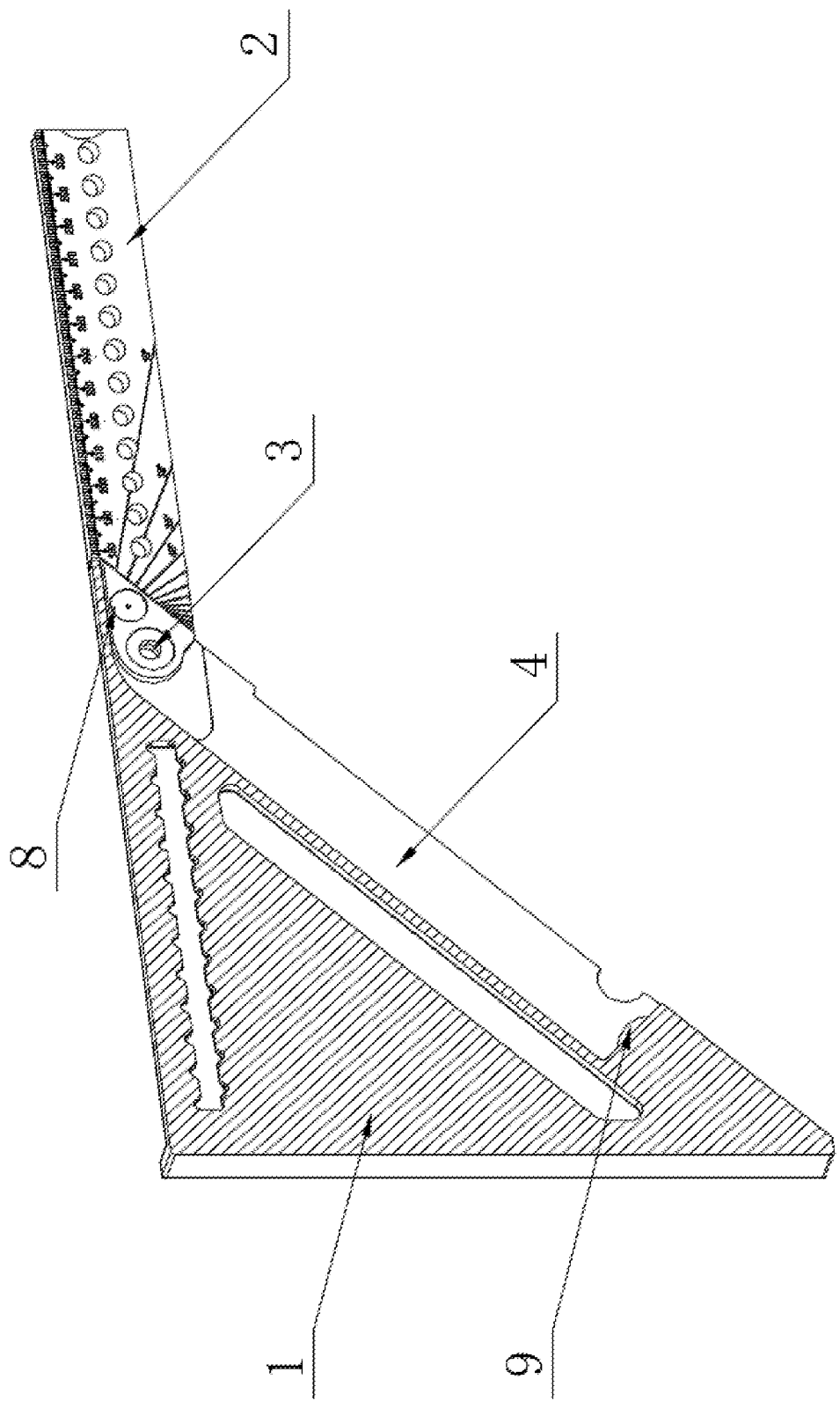
FIG. 2 is the cross-section structural view of the the triangular ruler body 1.
Figure 3:
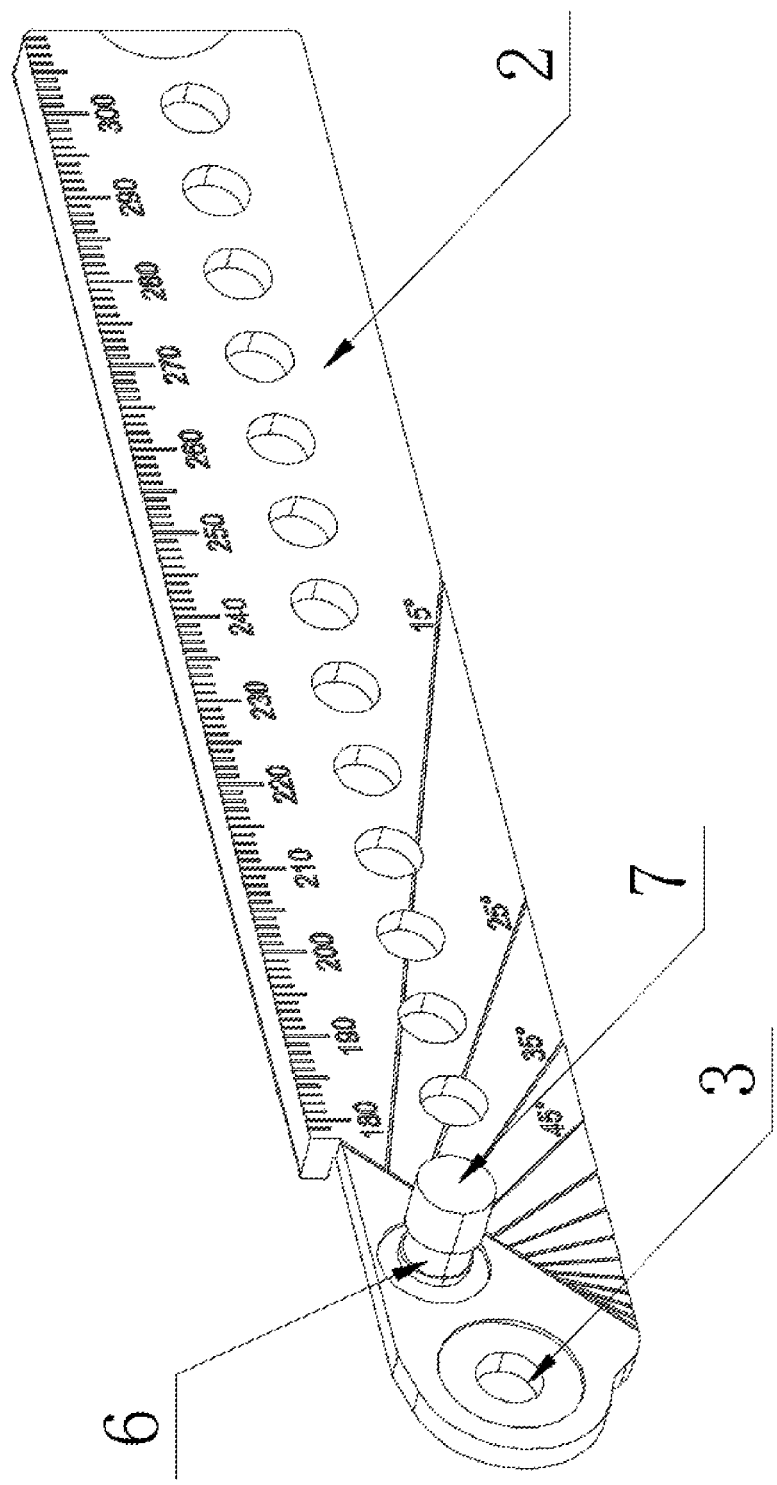
FIG. 3 is the perspective structural view of the extended ruler.

Hereinafter, embodiments of the present invention will be described in detail with reference to the accompanying drawings:

As shown in FIGS. 1, 2, and 3, a triangular ruler comprises the triangular ruler body 1, the right-angle edge of the triangle ruler body 1 is provided with the extended ruler 2, and the outer side of the extended ruler 2 is provided with the angle scale line, the interior of the triangle ruler body 1 and the extended ruler 2 are both provided with matching rotating holes 3, and an adjustment part is provided at the connection between the triangle ruler body 1 and the extended ruler 2, which is used for limiting the connection angle between the triangle ruler body 1 and the extended ruler 2.

The adjustment part includes: the circular groove 8 opened on one side of the extended ruler 2, the limiting hole 5 corresponding to the circular groove 8 is opened inside the triangle ruler body 1, the hollow sleeve 6 is provided inside the limiting hole 5 on the triangle ruler body 1, the clamping column 7 penetrating through the interior of the hollow sleeve 6, one end of the clamping column 7 is in contact with the circular groove 8 on the extended ruler 2.

In this embodiment, when measuring for a long distance, by rotating the extended ruler 2 until coincides with the right-angle edge of triangle ruler body 1, the extended ruler 2 is combined with the triangle ruler body 1 for long-distance measurement. The extended ruler 2 could be limited by the clamping column 7 in the adjustment part penetrates through the hollow sleeve 6 and connected with the circular groove 8.

When measuring trapezoids or different angles, during the process of rotating extended ruler 2, an included angle is formed between extended ruler 2 and the bevel angel edge of the triangle ruler body 1, combined with the angle marking of extended ruler 2, the angle measurement and the trapezoid measurement could be carried out through the included angle, in addition, the angle could be limited by the adjustment part for easy measurement.

As an implementation method, as shown in FIGS. 1, 2, and 3, the triangular ruler body 1 is interconnected with the rotating hole 3 opened inside the extended ruler 2, which is used for the penetration of the clamping column 7.

During use, the clamping column 7 penetrates through the triangle ruler body 1 and the rotating hole 3 opened inside the extended ruler 2, then rotate the extended ruler 2 until coincides with the right-angle edge of triangle ruler body 1, the extended ruler 2 and the triangle ruler body 1 are combined for long-distance measurement.

When drawing circle is needed, place the pen into the circular holes at different positions inside the extended ruler 2 when rotating the extended ruler 2, in order to achieve the purpose of drawing circles of different diameters. In addition, the extended ruler 2 and the bevel angle edge of the triangle ruler body 1 could form an included angle during the rotation of the extended ruler, combined with the angle marking on the extended ruler 2, the angle measurement and the trapezoid measurement could be carried out through the included angle.

Figure 4:
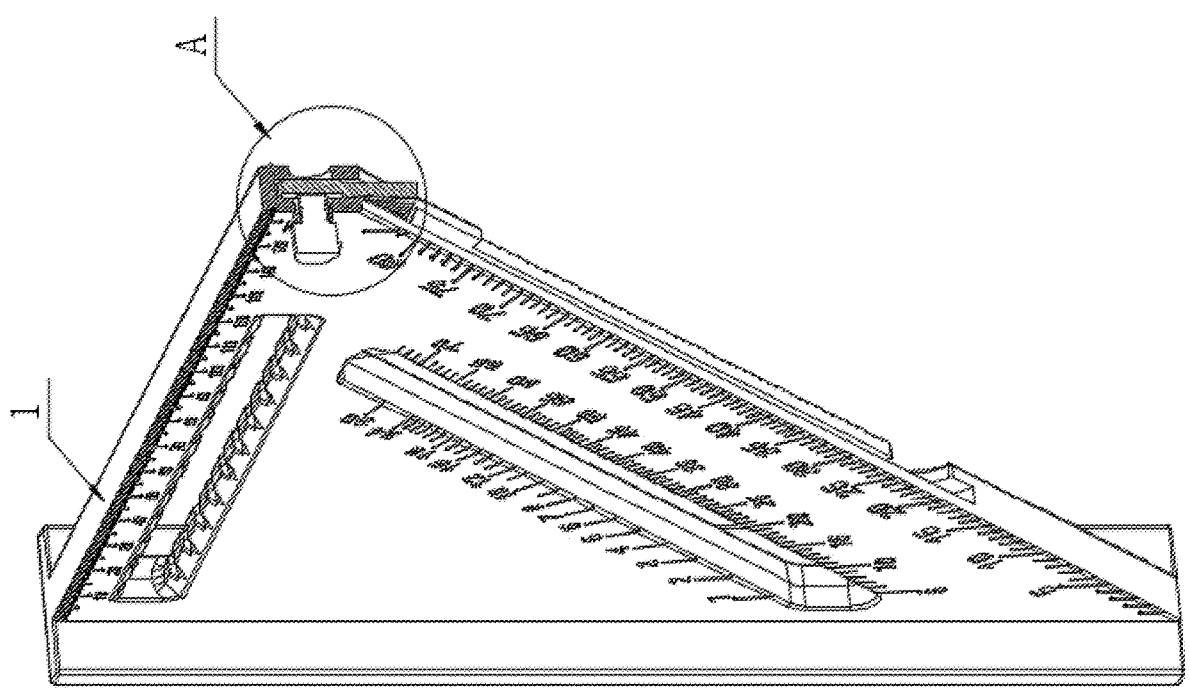
FIG. 4 is the internal cross-section structural view of the adjustment part.
Figure 5:
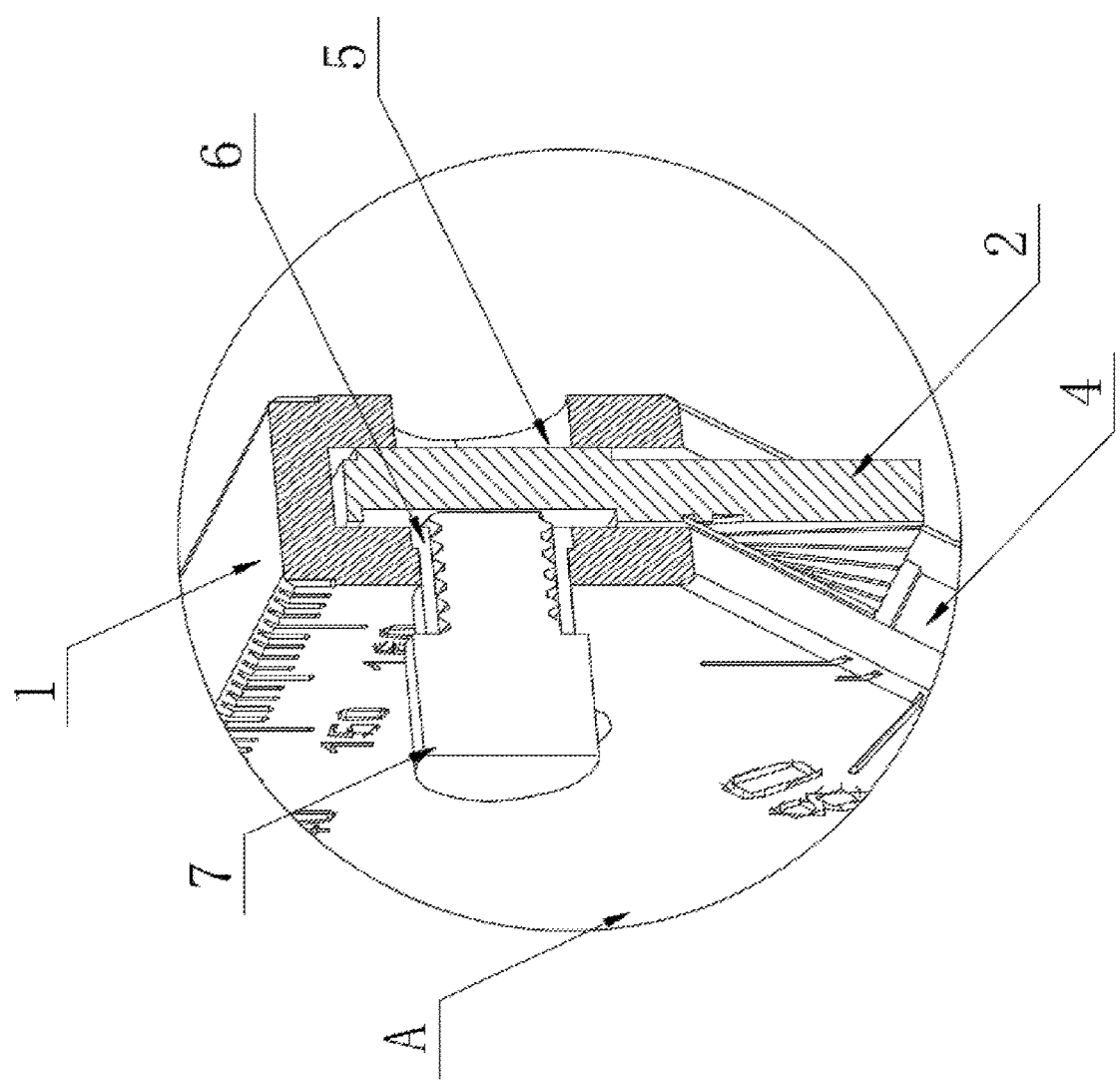
FIG. 5 is the structural view of Part A in FIG. 4.

As an implementation method, as shown in FIGS. 1, 4, and 5, the outer side of the clamping column 7 and the inner wall of the hollow sleeve 6 are provided with corresponding threaded parts.

Through the design of the threaded part, the clamping column 5 could be rotated inside the hollow sleeve 6, and the clamping column 5 gradually connected with the circular groove 8, in order to achieve the function of limiting the extended ruler 2.

As an implementation method, as shown in FIGS. 2, the accommodating groove 4 is opened inside the inclined edge of the triangular ruler body 1, which is used for accommodating the extended ruler 2.

When the extended ruler 2 is rotated towards the accommodating groove 4 at the inclined edge of the triangle ruler body 1, until the extended ruler 2 coincides with the accommodating groove 4, it could be folded and conveniently stored.

As an implementation method, as shown in FIGS. 1 and 2, one side of the accommodating groove 4 within the triangular ruler body 1 is provided with a semi-circular opening, which is used for the rotation of the extended ruler 2.

When the extended ruler 2 coincides with the accommodating groove 4, it is convenient to separate the extended ruler 2 from the accommodating groove 4 through the inside of the semi-circular opening.

As an implementation method, as shown in FIGS. 1, 2 and 3, the elastic protrusion 9 is provided inside the accommodating groove 4 of the triangular ruler body 1, and the elastic protrusion 9 is in the structure of arc-shaped, one end of the extended ruler 2 is provided with the arc-shaped groove that matches with the elastic protrusion 9.

When the extended ruler 2 rotates towards the accommodating groove 4 at the inclined edge of the triangle ruler body 1, the extend ruler 2 first compresses the elastic protrusion 9 until the extended ruler 2 fully enters into the accommodating groove 4. The arc-shaped opened at the end of the extended ruler 2 is matched and connected with the elastic protrusion 9, which is facilitate for folding and carrying, and prevent shaking and separation of extended ruler 2.

The working principle is: when measuring for a long distance during use, the clamping column 7 penetrates through the triangle ruler body 1 and the rotating hole 3 opened inside the extended ruler 2, then rotate the extended ruler 2 until coincides with the right-angle edge of triangle ruler body 1, the extended ruler 2 and the triangle ruler body 1 are combined for long-distance measurement. Further, take out the clamping column 7 and insert the clamping column 7 into the hollow sleeve 6 in the limiting hole 5, which connected with the circular groove 8, in order to achieve the function of limiting the extended ruler 2.

When angle measurement and the trapezoid measurement is needed, when rotating the extended ruler 2, the extended ruler 2 and the bevel angle edge of the triangle ruler body 1 could form an included angle during the rotation of the extended ruler, combined with the angle marking on the extended ruler 2, the angle measurement and the trapezoid measurement could be carried out through the included angle. Further, clamping column 7 penetrates through the hollow sleeve 6 and connected with circular groove 8 of extended ruler 2, in order to achieve the function of limiting the extended ruler 2 and convenient for measurement.

After use, the extended ruler 2 is rotated towards the accommodating groove 4 at the inclined edge of the triangle ruler body 1, until the extended ruler 2 coincides with the accommodating groove 4, it could be folded and conveniently stored.

Hereinafter, it should be noted that the above are only the preferred embodiments of the present invention, and are not intended to limit the present invention. Although the present invention has been described in detail with reference to the aforementioned embodiments, it is still possible for those skilled in this field to modify the technical solutions described in the aforementioned embodiments, or equivalently replace some of the technical features.

Any modification, equivalent substitution, improvement, etc. made within the spirit and principle of the present invention shall be included in the scope of protection of the present invention.

What is claimed is:

1. A triangular ruler comprising a triangular ruler body (1), wherein an extended ruler (2) is provided on the right-angle edge of the triangle ruler body (1), and the outer side of the extended ruler (2) is provided with the angle scale line, the interior of the triangle ruler body (1) and the extended ruler (2) are both provided with matching rotating holes (3), and an adjustment part is provided at the connection between the triangle ruler body (1) and the extended ruler (2), which is used for limiting the connection angle between the triangle ruler body (1) and the extended ruler (2);

wherein the adjustment part includes a circular groove (8) opened on one side of an extended ruler (2), a limiting hole (5) corresponding to the circular groove (8) is opened inside the triangular ruler body (1), a hollow sleeve (6) is provided inside the limiting hole (5) on the triangular ruler body (1), and a clamping column (7) penetrates through the interior of the hollow sleeve (6), one end of the clamping column (7) is in contact with the circular groove (8) on the extended ruler (2).

2. The triangular ruler according to claim 1, wherein the triangular ruler body (1) is interconnected with the rotating hole (3) opened inside the extended ruler (2), which is used for the penetration of the clamping column (7).

3. The triangular ruler according to claim 1, wherein the outer side of the clamping column (7) and the inner wall of the hollow sleeve (6) are provided with corresponding threaded parts.

4. The triangular ruler according to claim 1, wherein the accommodating groove (4) is opened inside the inclined edge of the triangular ruler body (1), which is used for accommodating the extended ruler (2).

5. The triangular ruler according to claim 4, wherein an elastic protrusion (9) is provided inside the accommodating groove (4) of the triangular ruler body (1), and the elastic protrusion (9) is in the structure of arc-shaped, one end of the extended ruler (2) is provided with the arc-shaped groove that matches with the elastic protrusion (9).

6. The triangular ruler according to claim 1, wherein the one side of the accommodating groove (4) within the triangular ruler body (1) is provided with a semi-circular opening, which is used for the rotation of the extended ruler (2).

* * * * *